United States Patent
Fradette et al.

(10) Patent No.: US 9,953,548 B2
(45) Date of Patent: Apr. 24, 2018

(54) REMOVABLE TENSION-PNEUMOTHORAX-SIMULATOR CARTRIDGE FOR USE WITH A PATIENT SIMULATING MANNEQUIN

(75) Inventors: Yanick Fradette, Saint-Constant (CA); Yanick Cote, Lachine (CA); Christophe Courtoy, Boucherville (CA)

(73) Assignee: CAE HEALTHCARE CANADA INC.

( * ) Notice: Subject to any disclaimer, the term of this patent is extended or adjusted under 35 U.S.C. 154(b) by 734 days.

(21) Appl. No.: 13/990,191

(22) PCT Filed: Nov. 30, 2011

(86) PCT No.: PCT/US2011/062685
§ 371 (c)(1),
(2), (4) Date: Oct. 16, 2013

(87) PCT Pub. No.: WO2012/075170
PCT Pub. Date: Jun. 7, 2012

(65) Prior Publication Data
US 2014/0051050 A1    Feb. 20, 2014

Related U.S. Application Data

(60) Provisional application No. 61/418,141, filed on Nov. 30, 2010.

(51) Int. Cl.
*G09B 23/30* (2006.01)
*G09B 23/32* (2006.01)
(Continued)

(52) U.S. Cl.
CPC ........... *G09B 23/34* (2013.01); *G09B 23/288* (2013.01); *G09B 23/30* (2013.01); *G09B 23/32* (2013.01)

(58) Field of Classification Search
CPC ..................................................... G09B 23/30
See application file for complete search history.

(56) References Cited

U.S. PATENT DOCUMENTS 3,906,951 A  *  9/1975  Chen ..................... A61F 5/445
                                                      604/336
5,061,188 A     10/1991  McCollum
(Continued)

OTHER PUBLICATIONS

International Search Report from PCT/US2011/062685; Beauce, Gaetan; dated Jun. 3, 2012.
(Continued)

*Primary Examiner* — Thomas Hong
*Assistant Examiner* — Jennifer L Korb
(74) *Attorney, Agent, or Firm* — Fasken Martineau DuMoulin, LLP

(57) ABSTRACT

Removable tension-pneumothorax-simulator cartridge for use with a patient simulating mannequin, comprising a rigid body having a hollow cavity therein, the body having two openings in fluid communication with the cavity, the cavity being shaped and dimensioned so as to be capable of receiving therein through the first opening a 14-gauge 3.25 inch needle; the first opening having an associated first-opening closure releasably secured to the body and airtightly sealing the first-opening and including a first material pierceable by the needle when treating a simulation of a tension pneumothorax in the patient simulating mannequin, the first material being self-sealing such that when the needle is withdrawn the first material self-seals, the body being constructed of a second material not pierceable by the needle; the second opening being structured and dimensioned to releasably engage cooperable structure on the mannequin such that when the cartridge is inserted into the mannequin, the cooperable structure on the mannequin engages and airtightly seals the second opening and provides (Continued)

a channel in fluid communication with the cavity of the body for allowing for the entry of a pressured gas into the cavity for use in the simulation of the tension pneumothorax.

20 Claims, 16 Drawing Sheets

(51) Int. Cl.
  *G09B 23/34* (2006.01)
  *G09B 23/28* (2006.01)

(56) References Cited

U.S. PATENT DOCUMENTS

| | | |
|---|---|---|
| 6,234,804 B1 | 5/2001 | Yong |
| 2008/0091152 A1 | 4/2008 | Asherman |
| 2009/0291421 A1* | 11/2009 | Duprez ................. G09B 23/30 434/262 |

OTHER PUBLICATIONS

English translation of abstract, description and claims of DE3049508A1; retrieved from https://worldwide.espacenet.com/ on Oct. 20, 2016.

* cited by examiner

REMOVABLE TENSION-PNEUMOTHORAX-SIMULATOR CARTRIDGE FOR USE WITH A PATIENT SIMULATING MANNEQUIN

CROSS-REFERENCE TO RELATED APPLICATIONS

The present application is related to U.S. provisional patent application Ser. No. 61/418,141, filed Nov. 30, 2010, entitled "Removable Tension-Pneumothorax-Simulator Cartridge for Use with a Patient Simulating Mannequin". This application is incorporated herein by reference in its entirety.

FIELD OF THE INVENTION

The present invention relates to devices and methods related tension pneumothorax simulation in patient simulating mannequins.

BACKGROUND OF THE INVENTION

Pneumothorax is a collection of air or gas in the pleural cavity of the chest between the lung and the chest wall. Many pneumothoraxes occur after physical trauma to the chest, blast injury, or as a complication of medical treatment. Pneumothoraxes may also occur spontaneously in people without chronic lung conditions or lung disease, and more rarely, in those without a prexisting lung condition.

The symptoms of a pneumothorax are determined by the size of the air leak (from the lungs into the pleural cavity) and the speed with which it occurs. Such symptoms may include chest pain (in most cases) and shortness of breath (in many). If a pneumothorax is left untreated, air may increasingly enter the pleural cavity and thus increasingly affect the ability of the lungs to expand and the person's ability to breathe. Eventually the lungs may be prevented from expanding. This situation is termed tension pneumothorax. A tension pneumothorax will lead to severe oxygen shortage and low blood pressure, and will progress to cardiac arrest and death. It must be treated if the person is to survive.

The common procedure to treat a tension pneumothorax is to insert a hypodermic needle into the chest between the 2nd and the 3rd ribs into the pleural cavity, and to evacuate the air through the hypodermic needle by means of a syringe. After evacuation of the air the lungs should be able to expand fully again, and normal respiration should thereby be re-established (although this procedure may need to be repeated).

Medical personnel and emergency response personnel may be called on diagnose and treat a tension pneumothorax in urgent or emergency situations. The training of such medical and emergency personnel in such diagnosis and treatment is usually carried out on patient simulating mannequins. Such mannequins can simulate the symptoms of a tension pneumothorax and allow for the insertion of needle therein to simulate the treatment of a tension pneumothorax. Specifically a tension pneumothorax may be simulated by limiting the visible chest rise of the mannequin and/or by giving auditory clues to the trainee.

For treatment of the mannequin, a container located in the chest of the mannequin at the correct location (to simulate air in the pleural cavity) is filled with pressured air. The air pressure in the container is monitored by a pressure sensor. If the trainee performs a correct needle decompression by inserting a hypodermic needle through the chest skin and into the container, the pressured air is released to the environment through the needle. The pressure drop is detected by the mannequin's electronics and the mannequin starts to "breath" normally again.

Improvements in patient simulating mannequin technology have occurred over time, including in the area of tension pneumothorax simulation. For example, US Published Patent Application No. 2009/0291421 A1 (published Nov. 26, 2009, entitled "Simulator For Medical Training With Detachable Self-Sealing Hollow Member"—hereinafter the '421 Publication) describes, according to the abstract thereof, a "[s]imulator for medical training having at least a detachable, fluid-tight hollow member comprising: at least a portion . . . made of a self-sealing material; an opening . . . to fill said hollow member with a fluid, said opening . . . being provided with closure means . . . or being connected . . . to closure means; fastening means . . . to detachably fasten said hollow member to said simulator. The portion made of self-sealing material allows multiple punctures before having to be replaced." Notwithstanding the advancements described in the '421 Publication, improvements in this area are still possible.

SUMMARY OF THE INVENTION

It is an object of the present invention to ameliorate at least some of the inconveniences present in the prior art.

It is also an object of the present invention to provide improved technology related to tension pneumothorax simulation in patient simulating mannequins as compared with at least some of the prior art.

Particularly, the present inventors have realized that the structure described in the '421 Publication is not optimal for use in an automated self-contained patient simulating mannequin for use in realistic military combat medic training scenarios. Such scenarios require that a combat medic be trained to urgently administer chest decompression to treat a soldier with a tension pneumothorax using a 14-gauge 3.25 inch (8.255 cm) needle. The patient simulating mannequin must be able to accommodate such a needle, to allow for simulated treatment of the tension pneumothorax without damaging the mannequin, and to self-repair to enable repeated use of the mannequin in that scenario (e.g. . to simulate the patient developing a second tension pneumothorax) and in future scenarios without having to replace the tension pneumothorax simulation mechanism each time between training uses. It is believed that the structure described in the '421 Publication will not allow for this.

Thus, in one aspect, there is provided a removable tension-pneumothorax-simulator cartridge for use with a patient simulating mannequin. The cartridge comprises a rigid body having a hollow cavity therein. The body has two openings in fluid communication with the cavity. The cavity is shaped and dimensioned so as to be capable of receiving therein through the first opening a 14-gauge 3.25 inch needle for treating a tension pneumothorax. The first opening has an associated first-opening closure. The first-opening closure is releasably secured to the body and airtightly seals the first-opening. The first-opening closure includes a first material pierceable by the needle when treating a simulation of a tension pneumothorax in the patient simulating mannequin. The first material is self-sealing such that when the needle having pierced the first material is withdrawn from the first material the first material self-seals. The body is constructed of a second material not pierceable by the needle. The first opening being located on the body such that when the cartridge is inserted into the patient simulating mannequin the first material is accessible to a person attempting to treat the simulation of the tension pneumothorax by insertion of the needle into the patient simulating mannequin. The second opening is structured and dimensioned to releasably engage cooperable structure on the patient simulating mannequin such that when the cartridge is inserted into the patient simulating mannequin, the cooperable structure on the patient simulating mannequin engages and airtightly seals the second opening and provides a channel in fluid communication with the cavity of the body for allowing for the entry of a pressured gas into the cavity for use in the simulation of the tension pneumothorax.

Without wishing to be bound by any particular theory of operation, the present inventors have realized that an amelioration over the prior art is the aforementioned combination of a rigid non-pierceable body with a cavity sized and dimensioned to receive a 14-gauge 3.25 inch (8.255 cm) needle with a removable closure having a pierceable self-sealing material sealing an opening in the cavity.

Depending on the level and type of wear on the cartridge after repeated use, either the entire cartridge or simply the closure having the pierceable self-sealing material may be replaced. It is anticipated that at least in some embodiments a cartridge as described herein would able to undergo at least between 200 and 500 uses before the pierceable self-sealing material would need to be replaced.

In some embodiments the first-opening closure has a rigid wall surrounding the first material. In some of such embodiments, the first-opening closure has a rigid flange attached to the wall. In some of such embodiments the first-opening closure is releasably secured to the body via fasteners fastening the closure to the body. In some of such embodiments the wall is shaped to complete at least one of $2^{nd}$ and $3^{rd}$ simulated human ribs of the patient simulating mannequin when the cartridge is inserted into the patient simulating mannequin. In some embodiments the rigid wall is made of molded urethane having a Shore hardness of 80A, although any suitable material, particularly suitable plastic material will suffice.

In some embodiments the first material is one selected from a group consisting of silicone rubbers. In some of such embodiments the first material is a mixture of 50% by volume DRAGON SKIN® 10 silicone rubber and 50% by volume SLACKER® tactile mutator, both of which are manufactured by Smooth-On, Inc. of Easton, Pa., USA.

In some embodiments there is an outer covering layer covering the first material. In some of such embodiments the outer covering layer includes a material selected from the group of consisting of silicone rubbers. In some of such embodiments the outer covering layer includes or is DRAGON SKIN® 10 silicone rubber manufactured by Smooth-On, Inc. of Easton, Pa., USA. DRAGON SKIN® 10 silicone rubber has a Shore hardness of 10A.

In some embodiments there is an inner covering layer covering the first material. In some of such embodiments the inner covering layer includes one selected from the group of consisting of silicone rubbers. In some of such embodiments the inner covering layer includes or is DRAGON SKIN® 20 silicone rubber manufactured by Smooth-On, Inc. of Easton, Pa., USA. In some such embodiments, the inner layer has a Shore hardness of approximately that of the human pleural cavity to yield a more realistic "pop" sensation when pierced akin to the sensation that piercing the pleural cavity itself would yield. DRAGON SKIN® 20 silicone rubber has a Shore hardness of 20A.

In some embodiments the body has a side wall and a bottom wall, and the first opening is at the top of the body and the second opening is in the bottom wall of the body. In some of such embodiments the side wall of the body is a front side wall, a rear side wall, a left side wall, and a right side wall. In some embodiments the side wall is made of molded urethane having a Shore hardness of 80A, although any suitable material, particularly suitable plastic material will suffice.

In some embodiments the second opening releasably engages the cooperable structure on the patient simulating mannequin via a press fit. In some of such embodiments the second opening includes a second-opening cylinder extending into the cavity. The cooperative structure of the patient simulating mannequin includes a cooperative-structure cylinder. The press fit is between the second-opening cylinder and the cooperative-structure cylinder when the cartridge is inserted into the patient simulating mannequin. In some of such embodiments the channel is formed by a passage through the cooperative structure cylinder. In some of such embodiments the cartridge is releasably secured to the patient simulating mannequin solely via the press fit between the second opening and the cooperable structure, as this arrangement makes it relatively simply to insert and remove the cartridge as necessary. It should be understood however that this is not required and cartridges having various locking mechanism are within the scope of the present disclosure.

In another aspect there is provided a closure for releasably sealing a first opening in a tension-pneumothorax-simulator cartridge for use with a patient simulating mannequin. The tension-pneumothorax-simulating mannequin cartridge has a rigid body having a hollow cavity therein. The body has the first opening and a second opening, both openings being in fluid communication with the cavity. The cavity is shaped and dimensioned so as to be capable of receiving therein through the first opening a 14-gauge 3.25 inch needle for treating a tension pneumothorax. The body is constructed of a second material not pierceable by the needle. The first opening is located on the body such that when the cartridge is inserted into the patient simulating mannequin the first material is accessible to a person attempting to treat the simulation of the tension pneumothorax by insertion of the needle into the patient simulating mannequin. The closure is releasably securable to the body of the cartridge and airtightly seals the first opening when releasably secured to the body of the cartridge. The closure includes a first material pierceable by the needle when treating a simulation of a tension pneumothorax in the patient simulating mannequin. The first material is self-sealing such that when the needle having pierced the first material is withdrawn from the first material the first material self-seals.

In some embodiments the first-opening closure has a rigid wall surrounding the first material. In some of such embodiments, the first-opening closure has a rigid flange attached to the wall and the first-opening closure is releasably secured to the body via fasteners fastening the flange to the body. In some of such embodiments the wall is shaped to complete at least one of $2^{nd}$ and $3^{rd}$ simulated human ribs of the patient simulating mannequin when the cartridge is inserted into the patient simulating mannequin. In some embodiments the rigid wall is made of molded urethane having a Shore hardness of 80A, although any suitable material, particularly suitable plastic material will suffice.

In some embodiments the first material is one selected from a group consisting of silicone rubbers. In some of such embodiments the first material is a mixture of 50% by volume DRAGON SKIN® 10 silicone rubber and 50% by volume SLACKERS® tactile mutator, both of which are manufactured by Smooth-On, Inc. of Easton, Pa., USA.

In some embodiments there is an outer covering layer covering the first material. In some of such embodiments the outer covering layer includes a material selected from the group of consisting of silicone rubbers. In some of such embodiments the outer covering layer includes or is DRAGON SKIN® 10 silicone rubber manufactured by Smooth-On, Inc. of Easton, Pa., USA. DRAGON SKIN® 10 silicone rubber has a Shore hardness of 10A.

In some embodiments there is an inner covering layer covering the first material. In some of such embodiments the inner covering layer includes one selected from the group of consisting of silicone rubbers. In some of such embodiments the inner covering layer includes or is DRAGON SKIN® 20 silicone rubber manufactured by Smooth-On, Inc. of Easton, Pa., USA. In some such embodiments, the inner layer has a Shore hardness approximately that of the human pleural cavity to yield a more realistic "pop" sensation when pierced akin to the sensation that piercing the pleural cavity itself would yield. DRAGON SKIN® 20 silicone rubber has a Shore hardness of 20A.

In still another aspect, there is provided a patient simulating mannequin for simulating treatment of a tension pneumothorax. The simulating mannequin comprising simulated $2^{nd}$ and $3^{rd}$ human ribs, and a removable tension-pneumothorax-simulator cartridge releasably secured to the patient simulating mannequin. The cartridge includes: a rigid body having a hollow cavity therein, the body having two openings in fluid communication with the cavity. The cavity is shaped and dimensioned so as to be capable of receiving therein through a first opening a 14-gauge 3.25 inch needle for treating a tension pneumothorax. The first opening has an associated first-opening closure. The first-opening closure is releasably secured to the body and airtightly seals the first-opening. The first-opening closure includes a first material pierceable by the needle when treating a simulation of a tension pneumothorax in the patient simulating mannequin. The first material is self-sealing such that when the needle having pierced the first material is withdrawn from the first material the first material self-seals. The body is constructed of a second material not pierceable by the needle. The first opening is located on the body such that the first material is accessible to a person attempting to treat the simulation of the tension pneumothorax by insertion of the needle into the patient simulating mannequin between the $2^{nd}$ and $3^{rd}$ simulated human ribs. The second opening is structured and dimensioned to releasably engage cooperable structure on the patient simulating mannequin. The cooperable structure on the patient simulating mannequin engages and airtightly seals the second opening and provides a channel in fluid communication with the cavity of the body for allowing for the entry of pressured gas into the cavity for use in the simulation of the tension pneumothorax.

In some embodiments the first-opening closure has a rigid wall surrounding the first material. In some of such embodiments, the first-opening closure has a rigid flange attached to the wall and the first-opening closure is releasably secured to the body via fasteners fastening the flange to the body. In some of such embodiments the wall is shaped to complete at least one of $2^{nd}$ and $3^{rd}$ simulated human ribs of the patient simulating mannequin when the cartridge is inserted into the patient simulating mannequin. In some embodiments the rigid wall is made of molded urethane having a Shore hardness of 80A, although any suitable material, particularly suitable plastic material will suffice.

In some embodiments the first material is one selected from a group consisting of silicone rubbers. In some such embodiments the first material is a mixture of by volume DRAGON SKIN® 10 silicone rubber and 50% by volume SLACKER® tactile mutator, both of which are manufactured by Smooth-On, Inc. of Easton, Pa., USA.

In some embodiments there is an outer covering layer covering the first material. In some of such embodiments the outer covering layer includes a material selected from the group of consisting of silicone rubbers. In some of such embodiments the outer covering layer includes or is DRAGON SKIN® 10 silicone rubber manufactured by Smooth-On, Inc. of Easton, Pa., USA. DRAGON SKIN® 10 silicone rubber has a Shore hardness of 10A.

In some embodiments there is an inner covering layer covering the first material. In some of such embodiments the inner covering layer includes one selected from the group of consisting of silicone rubbers. In some of such embodiments the inner covering layer includes or is DRAGON SKIN® 20 silicone rubber manufactured by Smooth-On, Inc. of Easton, Pa., USA. In some such embodiments, the inner layer has a Shore hardness approximately that of the human pleural cavity to yield a more realistic "pop" sensation when pierced akin to the sensation that piercing the pleural cavity itself would yield. DRAGON SKIN® 20 silicone rubber has a Shore hardness of 20A.

In some embodiments the mannequin further includes a simulated human rib cage. In some of such embodiments the other parts of the $2^{nd}$ and $3^{rd}$ simulated ribs are formed in the simulated human rib case. In some of such embodiments the simulated human rib cage includes a recess receiving the removable tension-pneumothorax-simulator cartridge therein. In some of such embodiments the recess includes a recess bottom wall and a recess side wall having a shape and dimensions complimentary to those of an exterior of the removable tension-pneumothorax-simulator cartridge. In some of such embodiments the cooperable structure is located on the bottom wall of the recess.

In yet another aspect, there is provided a method of simulating treatment of a tension pneumothorax with a patient simulating mannequin comprising: admitting pressurized gas into the interior of a container within the patient simulating mannequin to raise the pressure of the gas in the interior of the container to a pressure above atmospheric pressure, the container being pierceable by a needle; sensing a pressure drop in the pressure of the gas in the interior of the container caused by the needle piercing the container and being inserted into the interior of the container by a person attempting to treat the simulated tension pneumothorax; and when the pressure drop is sensed, releasing pressurized gas to provide an auditory signal simulating a release of air from a pleural cavity of a human being treated for a tension pneumothorax.

In some embodiments, the pressure above atmospheric pressure is between 0 psi (0 kPa) and 2 psi (13.8 kPa).

In some embodiments, admitting pressurized gas into the interior of a container within the patient simulating mannequin to raise the pressure of the gas in the interior of the container to a first pressure above atmospheric pressure is admitting pressurized gas via a pump.

In some embodiments releasing pressurized gas to provide an auditory signal simulating a release of air from a pleural cavity of a human being treated for a tension pneumothorax is releasing pressurized gas from a pressurized gas reservoir in the interior of the patient simulating mannequin.

In still yet another aspect there is provided a patient simulating mannequin for simulating treatment of a tension pneumothorax, the simulating mannequin comprising: a computer processor; a computer readable persistent storage medium having instructions that when executed by the computer process cause: admission of pressurized gas into the interior of a container within the patient simulating mannequin to raise the pressure of the gas in the interior of the container to a pressure above atmospheric pressure, the container being pierceable by a needle; monitoring for a pressure drop in the pressure of the gas in the interior of the container caused by the needle piercing the container and being inserted into the interior of the container by a person attempting to treat the simulated tension pneumothorax; and release of pressurized gas to provide an auditory signal simulating a release of air from a pleural cavity of a human being treated for a tension pneumothorax, when the pressure drop is detected.

In some embodiments, the pressure above atmospheric pressure is between 0 psi (0 kPa) and 2 psi (13.8 kPa).

In some embodiments, admission of pressurized gas into the interior of a container within the patient simulating mannequin to raise the pressure of the gas in the interior of the container to a pressure above atmospheric pressure is admission of pressurized gas via a pump.

In some embodiments the release of pressurized gas to provide an auditory signal simulating a release of air from a pleural cavity of a human being treated for a tension pneumothorax is a release of pressurized gas from a pressurized gas reservoir in the interior of the patient simulating mannequin.

For purposes of this application, the term "self-sealing" means that the material has to retain a pressure of at least 1 psi (6.9 kPa) mbar for a period of at least 60 seconds.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF PREFERRED EMBODIMENTS

Figure 1A:
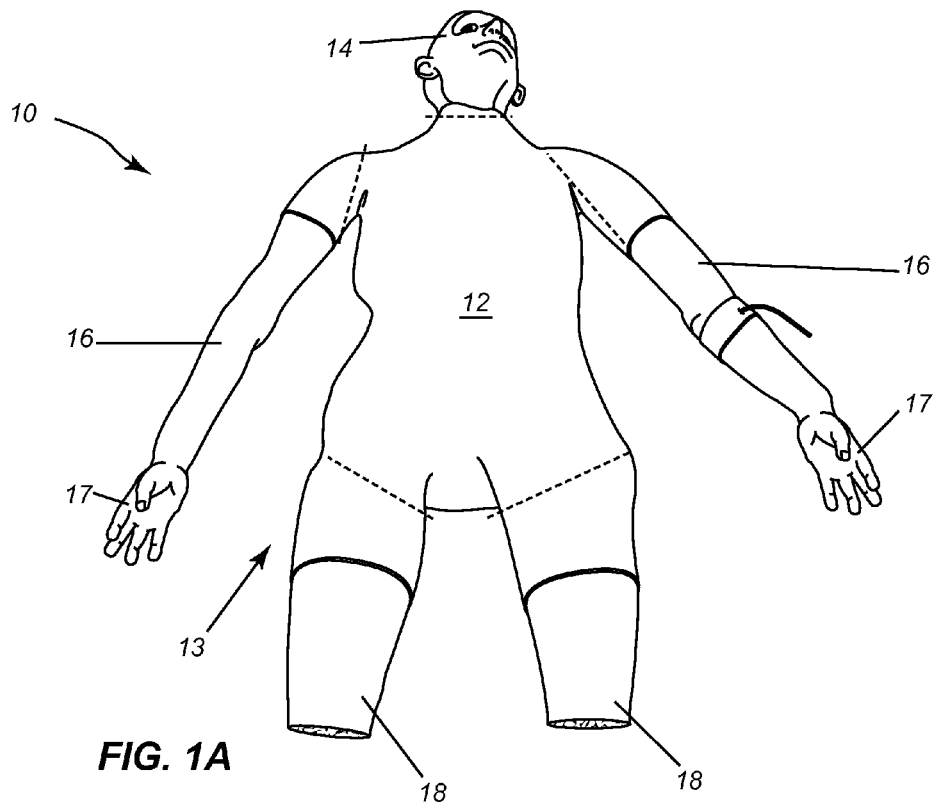
FIG. 1A is a bottom perspective view of a front of a patient simulating mannequin.
Figure 1B:
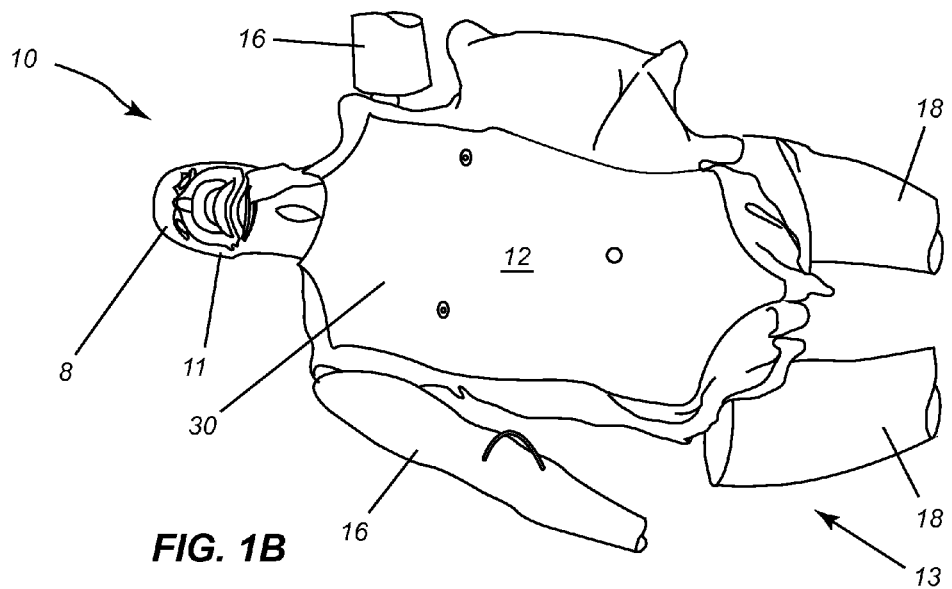
FIG. 1B illustrates skin being applied to a structural skeleton of the mannequin of FIG. 1A.

A mannequin 10 is illustrated in FIGS. 1A and 1B. The mannequin 10 is a patient simulating mannequin and is used as a medical training tool for paramedics, nurses, field medics and doctors when training for first aid delivery to injured patients. As will be described below, the mannequin 10 is adaptable to different trauma situations, thus providing a variety of scenarios to trainees. It is contemplated that the mannequin 10 could have uses other than those recited above, and that the mannequin 10 could be used by persons other than those of the medical field.

The mannequin 10 is a generally anatomically correct representation of an adult male. The mannequin measures 183 cm (6 feet) and weighs between 68 and 79 kg (between 150 pounds and 174 pounds). The weight is distributed throughout the mannequin 10 in a manner similar to that of an actual adult male. For example, the forearm of the mannequin 10 weighs about the same as the forearm of an actual adult male of the same size. It is contemplated that the mannequin 10 could be a female, a teenager, a child, or a senior. It is also contemplated that the mannequin 10 could be outside the measurements provided above.

The mannequin 10 has a torso 12, a head 14, and limbs 13. The limbs 13 include left and right arms 16, and left and right legs 18. The left and right arms 16 include left and right hands 17, and the left and right legs 18 include left and right feet 19 (only the left foot being shown in FIGS. 2A and 2B). The mannequin 10 has a structural skeleton 20 and is wrapped with a skin 30 (best seen in FIG. 1B). The skeleton 20 provides a structural frame to the mannequin 10, but also provides support to some of the electrical components and other systems of the mannequin 10. The skin 30 is an envelope to the mannequin 10. Each limb 13 is covered by a single piece of skin 30. The skin 30 is made of silicone which is flexible and has a feel and color resembling to that of the human skin. The skin 30 can be made of any color. The feet 19, hands 17 and head 14 are wrapped with skin 11 (made of silicone) that is sturdier than that of the torso 12, arms 16 and legs 18, since these parts are more likely to rub against surfaces when the mannequin 10 is displaced. Some portions of the mannequin 10, such as the limbs 13 contain a silicone filling (not shown) over which the skin 30 is disposed. The silicone filling provides the feel of human flesh and/or muscles when touched. It is contemplated that several skin pieces could be used to cover each limb 13. It is contemplated that the skin 30, the skin 11 and the filling could be made of materials other than silicone. The skeleton 20 will be described below.

Figure 2A:
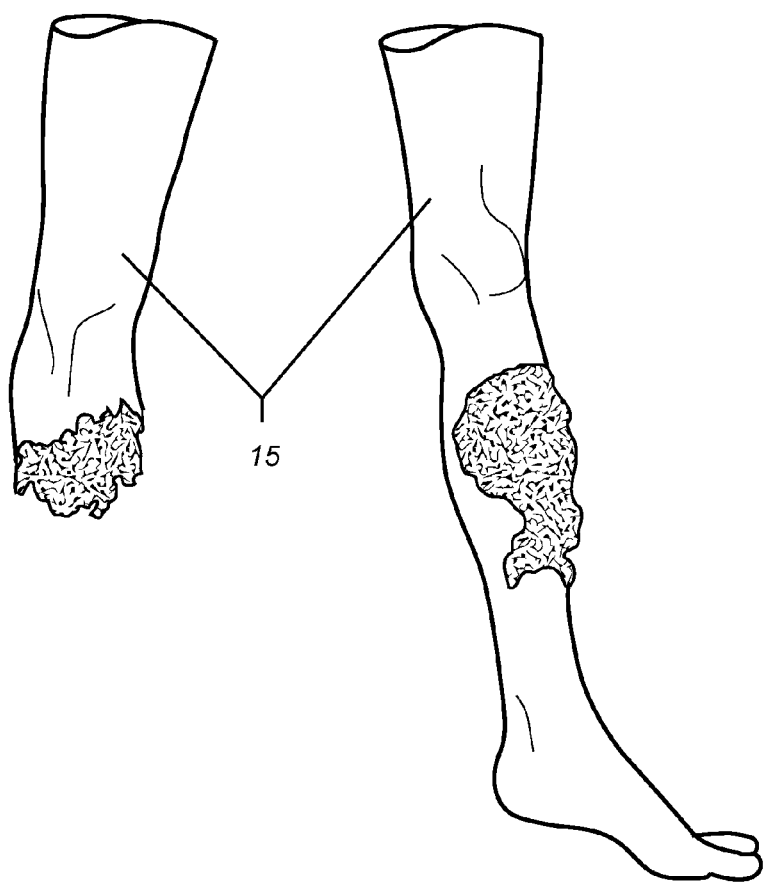
FIG. 2A is a picture taken from a front side of legs having a trauma which can be connected to the mannequin of FIG. 1A.
Figure 2B:
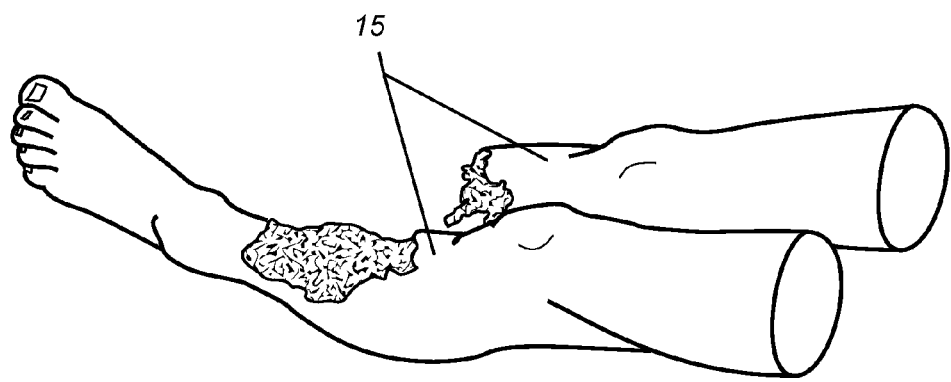
FIG. 2B is a picture taken from a top, left perspective of the legs of FIG. 2B.

The head 14 and the limbs 13 are each removable from the torso 12. The limbs 13 are replaceable by trauma limbs 15. The trauma limbs are shown in FIGS. 2A and 2B. A trauma limb 15 is a limb designed to simulate an injury. Examples of injuries are open wounds, burns, or partially or entirely amputated limbs. The trauma limbs 15 visually represent actual wounds for increased reality during a training session. They have similar color, shape and texture to that of actual wounds. To ensure a realistic simulation of a trauma, the mannequin 10 is equipped with a circulatory system (not shown) which is designed to allow blood to flow out of the trauma limbs 15. It is contemplated that only some of the left and right arms 16, and the left and right legs 18 could be replaceable by trauma limbs 15. It is also contemplated that only a portion of the left and right arms 16, and the left and right legs 18 could be replaceable by trauma limbs 15. For example, only a hand 17 or only a foot 19 could be detachable from a rest of the mannequin 10 and be replaceable by a trauma hand or foot. It is contemplated that the head 14 could be replaceable by a trauma head. It is also contemplated that the mannequin 10 could have other parts replaceable by trauma limbs depending on the training purpose.

Figures 3A, 3B:
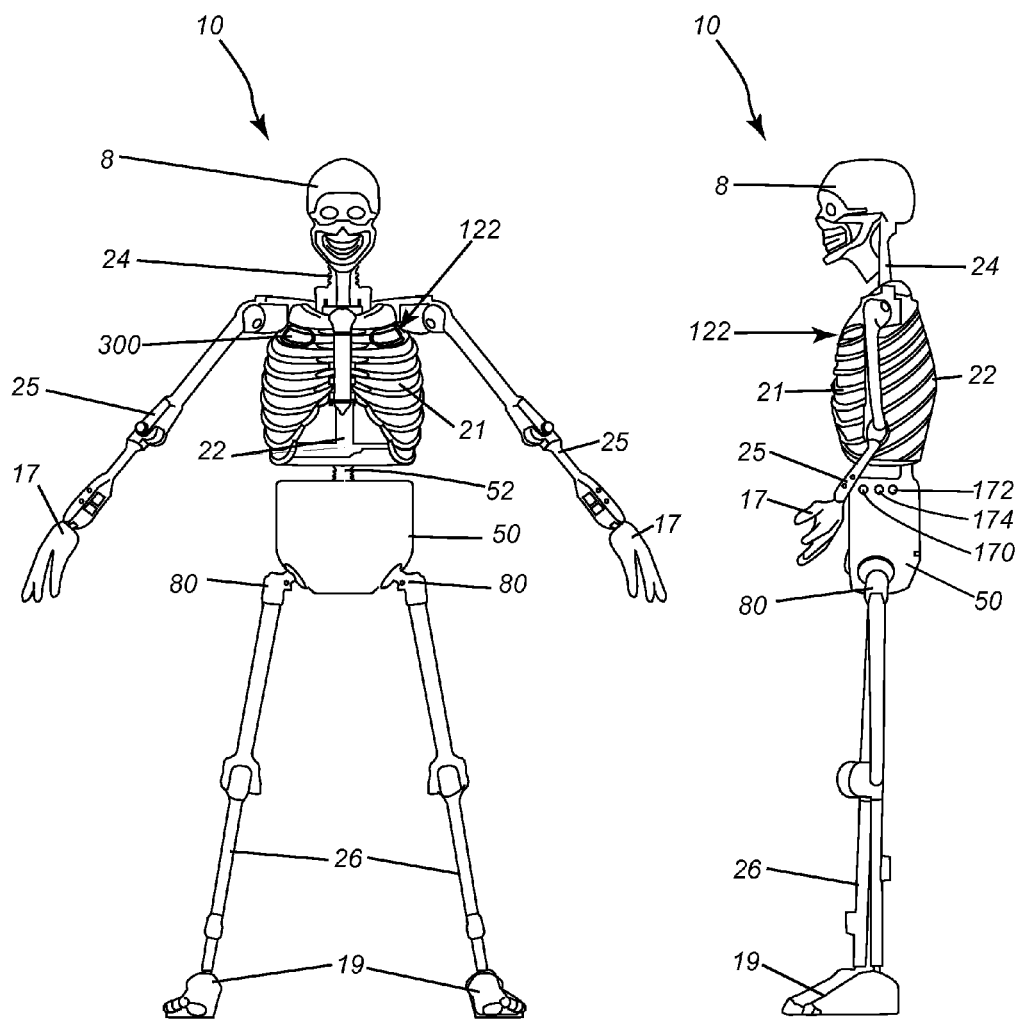
FIG. 3A is a front elevation view of the structural skeleton and various components of the mannequin of FIG. 1A.
FIG. 3B is a left side elevation view of the structural skeleton and various components of the mannequin of FIG. 1A.
Figure 19:
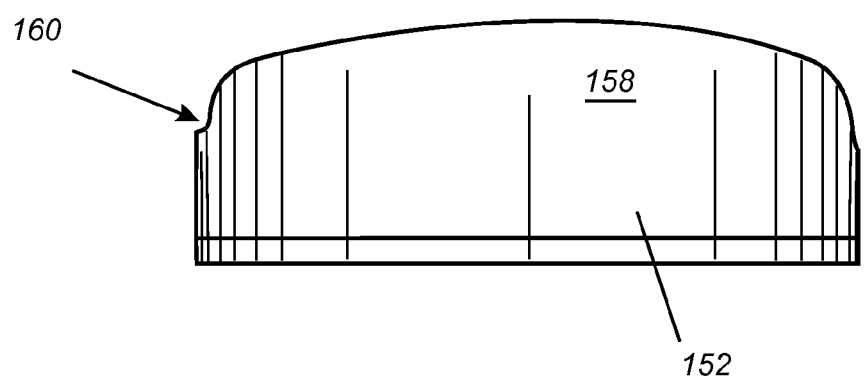
FIG. 19 is a front elevation view of the cap of FIG. 17.
Figure 20:
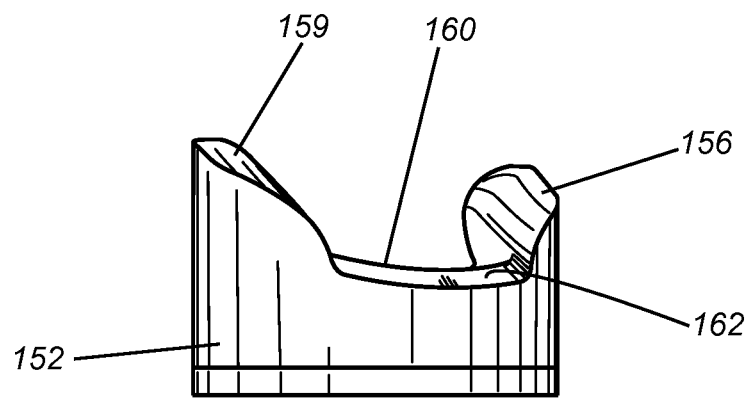
FIG. 20 is a right side elevation view of the cap of FIG. 17.
Figure 21:
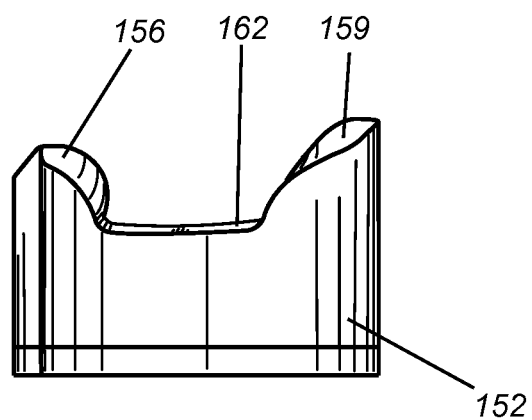
FIG. 21 is a left side elevation view of the cap of FIG. 17.

Referring now to FIGS. 3A and 3B, the skeleton 20 comprises a rib cage 21, a spinal structural member 22, a neck 24, left and right articulated arms 25, and left and right articulated legs 26. In the present embodiment, the spinal structural member 22 is a rigid member. A skull 8 is connected to the neck 24 and provides a structural frame to the head 14. The left and right articulated arms 25 are articulated at the shoulders, elbows and wrists. The left and right articulated arms 25 are connected to the spinal structural member 22 (see FIGS. 19 and 20). The left and right articulated legs 26 are articulated at the hips, knees, and ankles. The left and right articulated legs 26 are connected to the spinal structural member 22 via a pelvic structural member in the form of a structural control box 50. The structural box 50 acts as a structural part to the mannequin 10 similar to a pelvis, and as such is located in a pelvic region of the torso 12. The structural box 50 protects the electronic controls of the mannequin 10. The spinal structural member 22, the neck 24, the left and right articulated arms 25, and the left and right articulated legs 26 are made of aluminum. The skull 8 is made of urethane. It is contemplated that the spinal structural member 22, the neck 24, the left and right articulated arms 25, and the left and right articulated legs 26 could be made of other material, such as urethane.

The rib cage 21 is made of flexible urethane. The spinal structural member 22, the neck 24, the left and right arms 25, and the left and right legs 26 are made of several pieces which provide the mannequin 10 with an articulated motion and range of motion similar to that of an average young adult. It is contemplated that the rib cage 21 could be made of other flexible material, such as polyurethane.

The mannequin 10 is provided with multiple simulated physiological systems which interact with each other to provide a realistic simulation of a human patient. These include, but are not limited to, at least some of a pulse system, a voice system, an eye module, and a breathing system. These systems, when interacting with each other, provide physiological responses to traumas and treatments. In one embodiment, the mannequin 10 can be controlled wirelessly by an instructor, and physiological responses occur autonomously. The physiological responses include, but are not limited to, at least some of bleeding, change of heart beat, change of eye color, or change of breathing pattern. It is contemplated that, the mannequin 10 could be wired, and that the physiological responses could be controlled by one or more instructors.

Figure 4:
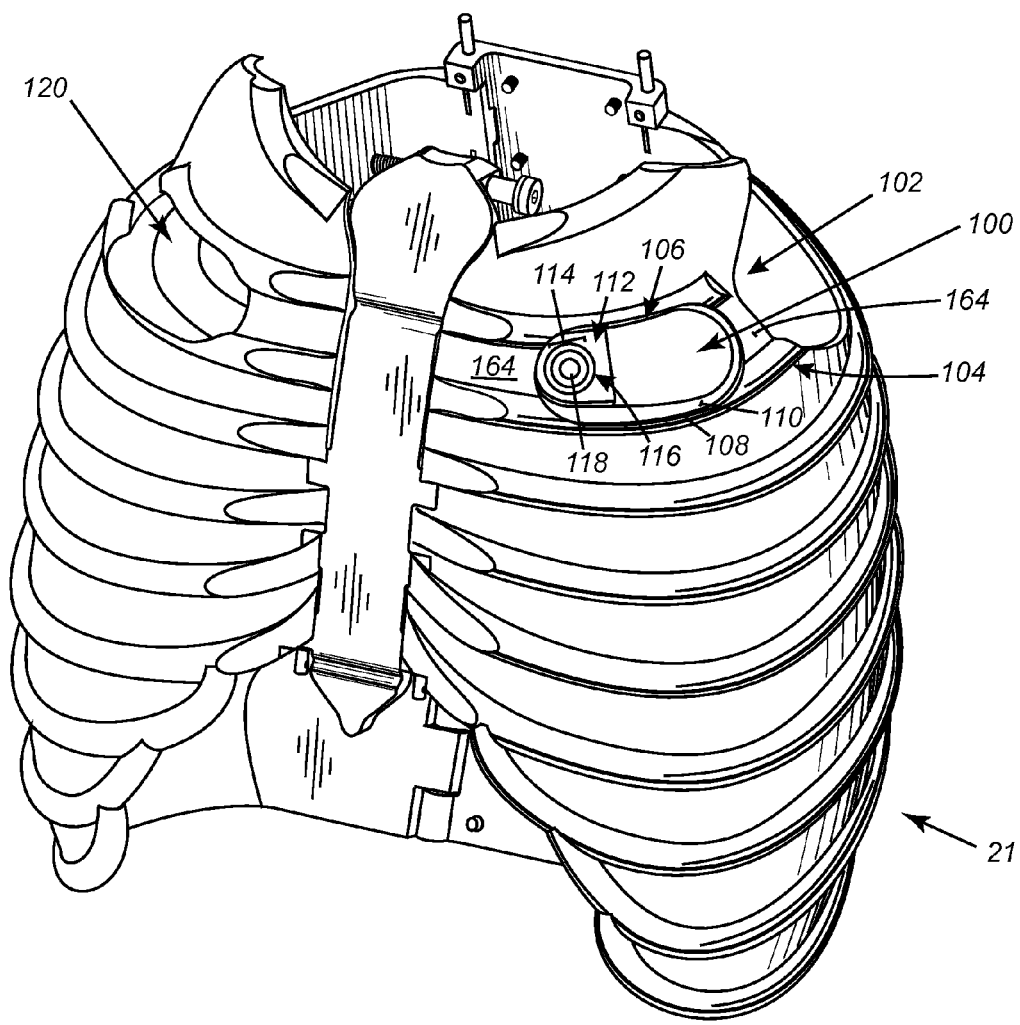
FIG. 4 is a left side front perspective view of the patent simulating mannequin simulated rib cage without removable tension-pneumothorax-simulator cartridges inserted in the recesses thereof.

The rib cage 21 is shown in a close-up view in FIG. 4. On the left side of the rib cage 21 there is a recess 100 for accommodating a removable tension-pneumothorax-simulator cartridge 122 that is described below. The recess 100 is located between the simulated $2^{nd}$ rib 102 and $3^{rd}$ rib 104 of the rib cage 21. The recess 100 is of such a size and shape that the recess 100 cuts into part of the $2^{nd}$ rib 102 (at section 106) and into part of the $3^{rd}$ rib 104 (at section 108).

The recess 100 has an integral side wall 110 encircling the recess 100. The side wall 110 is made from the same urethane material as is the rib cage 21. The recess 100 also has a bottom wall 112. On the bottom wall 112 there is a structure 114 that cooperates with the second opening 134 of the cartridge 122 (described below) such that when the cartridge 122 is inserted into the recess 100, the structure 114 on the bottom wall 112 of the recess 100 engages and airtightly seals the second opening 134 of the cartridge 122. The structure 114 comprises a cylinder 116 extending upward (i.e. toward the outer surface of the rib cage 21) from the bottom wall 112 of the recess 100. The cylinder 116 has a passage 118 therein that, when the cartridge 122 is inserted into the recess 100, provides a channel in fluid communication with the cavity 130 of the body 128 of the cartridge 122 for allowing for the entry of a pressured gas into the cavity 130 for use in the simulation of the tension pneumothorax. (The passage 118 is fluidly connected to the mannequin's pneumatic system a hose (not shown).) The bottom wall 112 and structure 114 are both made from the same urethane as is the rib cage 21. The side wall 110, bottom wall 112, and structure 114 are integrally molded with the rib cage 21 and are formed at the same time the rib cage is formed.

On the right side of the rib cage 21 there is another recess 120 for accommodating a second removable tension-pneumothorax-simulator cartridge (not shown). The right side recess 120 is the mirror image of the left side recess 100 and is otherwise identical thereto and will not be described in further detail.

Turning to FIGS. 6-15, a left side removable tension-pneumothorax-simulator cartridge 122 is shown. The cartridge 122 is a multiple piece unit comprising a top piece 124 and a bottom piece 126. The bottom piece 126 is a rigid body 128 made of molded urethane having a Shore Durometer of 80 A. The bottom piece 126 has a cavity therein 130. The cavity 130 has a first opening 132 and a second opening 134. The first opening 132 is located on the "top" of the body 128 such that when the cartridge 122 is inserted into the recess 110, the first opening 132 faces upward/outward from the mannequin. The cavity 130 is shaped and dimensioned so as to be capable of receiving therein through the first opening 132 a 14-gauge 3.25 inch needle. The second opening 134 is located on the "bottom" of the body 128; the bottom 137 being the surface of the body 128 opposite the first opening 132. The second opening 134 has the structure of a cylinder 136 with a cylindrical passage 138 therethrough. The cylinder 136 and the cylindrical passage 138 are sized and shaped so as to receive the structure 114 extending from the bottom wall 112 of the recess 100 of the rib cage 21 when the cartridge 122 is inserted into the recess 100 in a press fit relationship. In this manner, the exterior surface of the cylinder 116 of the structure 114 of the bottom wall 112 engages with and airtightly seals the interior surface of cylindrical passage 138 of the cylinder 136 of the second opening 134. When so sealed, the passage 118 through the cylinder 116 fluidly connects the cavity 130 of the body 128 to the mannequin's pneumatic.

The top piece 124 of the cartridge 122 functions as a closure to airtightly seal the first opening 132 of the body 128 of the bottom piece 126 of the cartridge 122 when the top piece 124 is releaseably secured to the body 128 of the body piece 126. The top piece 124 is releasably secured to the bottom piece 126 via four screws 140.

Figure 16:
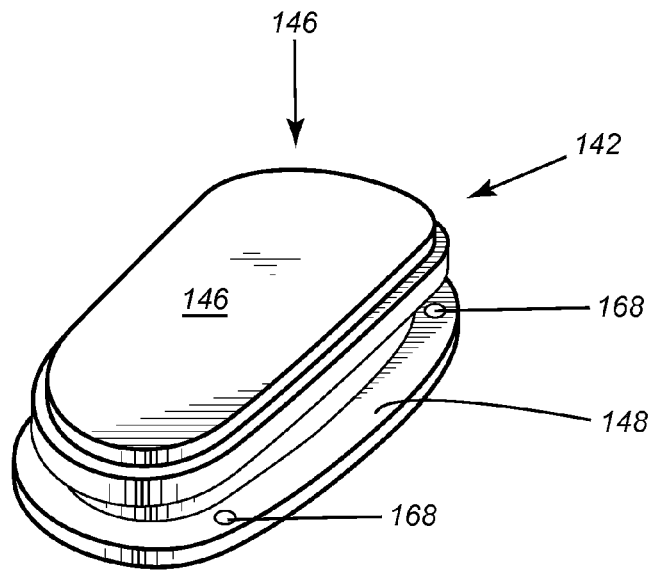
FIG. 16 is a rear top left side perspective view of a three-part structure (that is pierceable by a 14-gauge 3.25 inch needle during simulated treatment of a tension pneumothorax) of the top piece of the removable tension-pneumothorax-simulator cartridge of FIG. 6.
Figure 17:
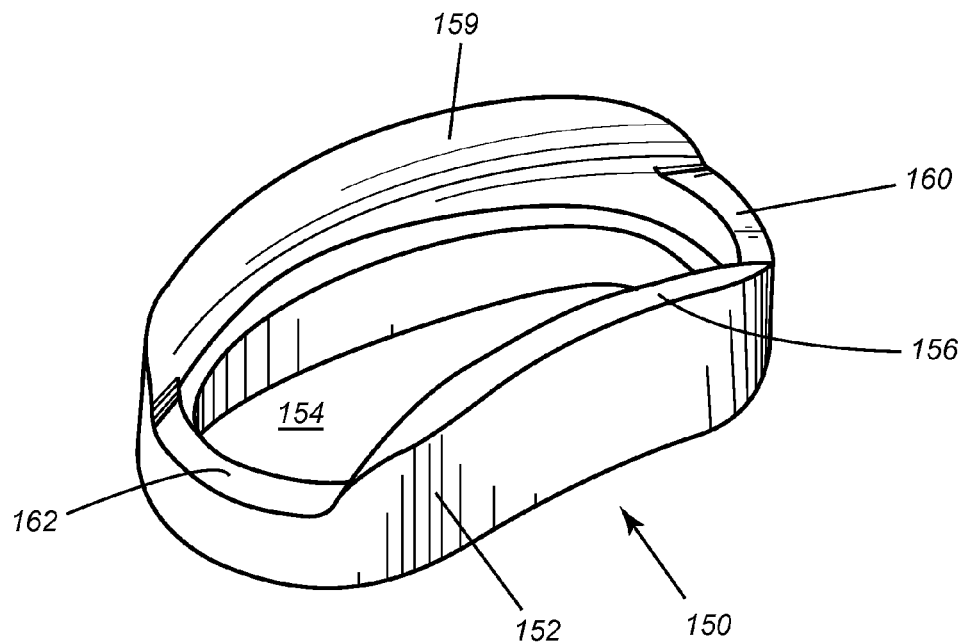
FIG. 17 is a rear top left side perspective view of the cap of the top piece of the removable tension-pneumothorax-simulator cartridge of FIG. 6.
Figure 18:
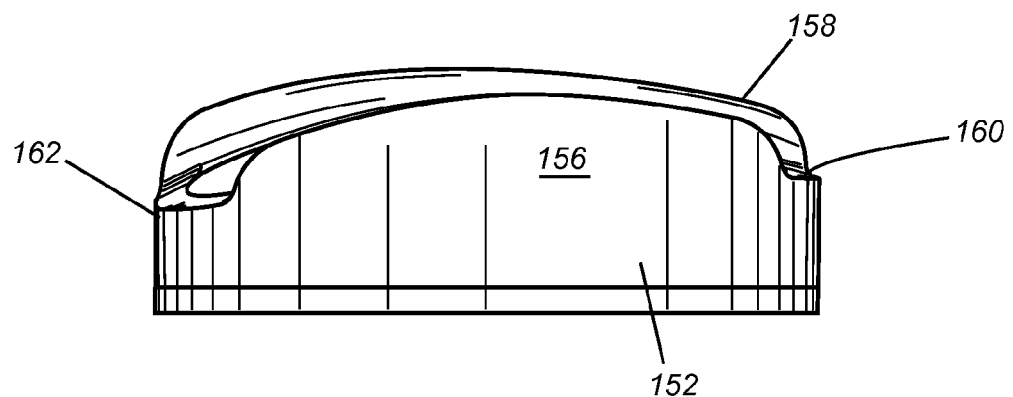
FIG. 18 is a rear elevation view of the cap of FIG. 17.

Referring also to FIG. 16, the top piece 124 has a three part structure 142 that is pierceable by a 14-gauge 3.25 inch needle during simulated treatment of a tension pneumothorax. Specifically the three part structure 142 is comprised of a central first material 144 that is self-sealing such that when a needle having pierced the central first material 144 is withdrawn, the first central material self seals. The central first material is a mixture of 50% by volume DRAGON SKIN® 10 silicone rubber and 50% by volume SLACKER® tactile mutator, both of which are manufactured by Smooth-On, Inc. of Easton, Pa., USA. The three part structure 142 is also comprised of an outer covering layer 146 covering the top (i.e. exterior-facing surface) of the central first material 144. The outer covering layer 146 is DRAGON SKIN® 10 silicone rubber manufactured by Smooth-On, Inc. of Easton, Pa., USA. DRAGON SKIN® 10 silicone rubber has a Shore hardness of 10A. Finally, the three part structure 142 has an inner covering layer 148 covering the bottom (i.e. interior-facing surface) of the central first material 144. The inner covering layer is DRAGON SKIN® 20 silicone rubber manufactured by Smooth-On, Inc. of Easton, Pa., USA DRAGON SKIN® 20 silicone rubber has a Shore hardness of 20A. The purpose of both the outer covering layer 146 and the inner covering layer 148 is to encapsulate and protect the central first material 144, and they are shaped to accomplish this function. The inner covering layer 148 has the additional function of simulating the real life "pop" experienced by someone performing a needle decompression when the needle penetrates the human pleural cavity. The inner covering layer accomplishes this function by having approximately the same hardness as the human pleural cavity.

The three-part structure 142 is made by first fabricating separately each of the first central material 144, the outer covering layer 146, and the inner covering layer 148, each in its own mold having the desired appropriate shape. Once the layers are completed they are replaced into the cap 150 (described below), which retains them in place, forming the completed top piece 124.

Referring also to FIGS. 17-23, in addition to the three-part structure 142, the top piece 124 also comprises a cap 150. The cap 150 is a rigid structure made of molded urethane similar to the body 128 of the bottom piece 126 of the cartridge. The cap 150 has Shore hardness of 80A. The cap surrounds and protects the three-part structure 142.

Figure 5:
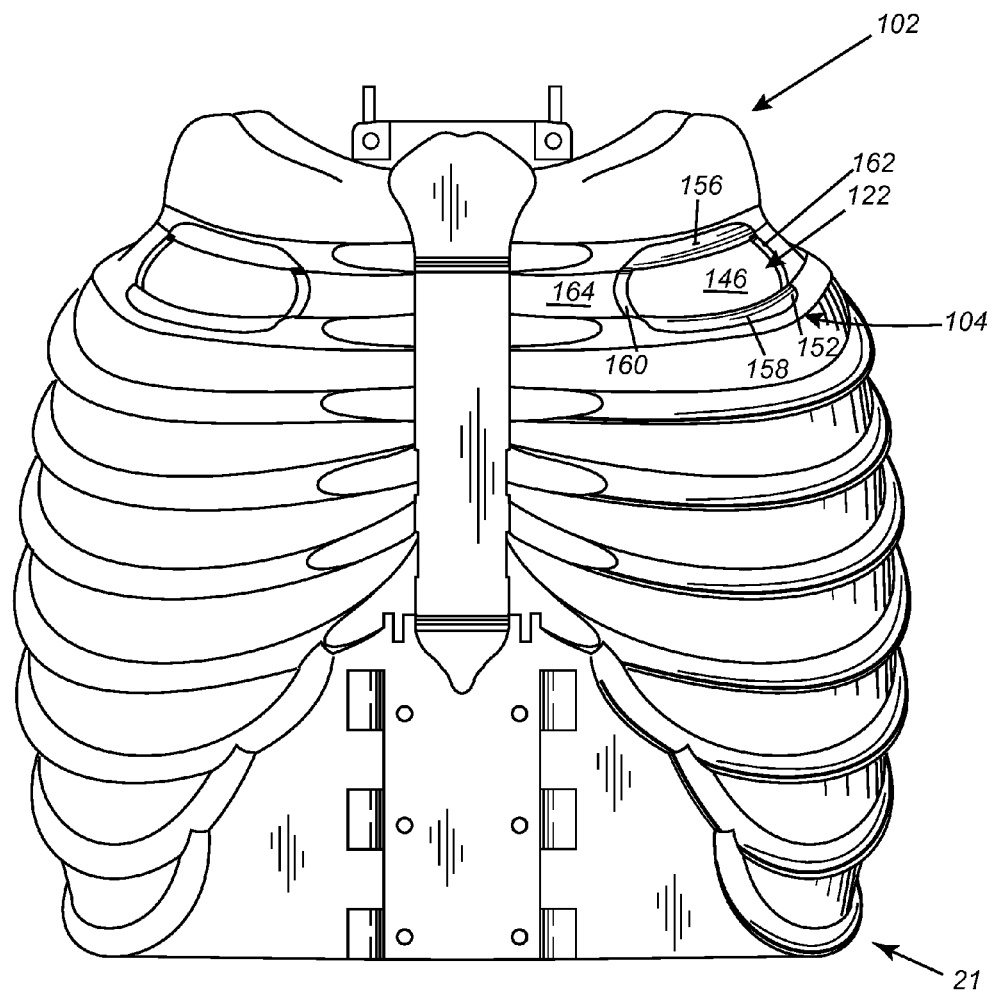
FIG. 5 is a front elevation view of the patent simulating mannequin simulated rib cage with removable tension-pneumothorax-simulator cartridges (including the one of FIG. 6) inserted in the recesses thereof.
Figure 6:
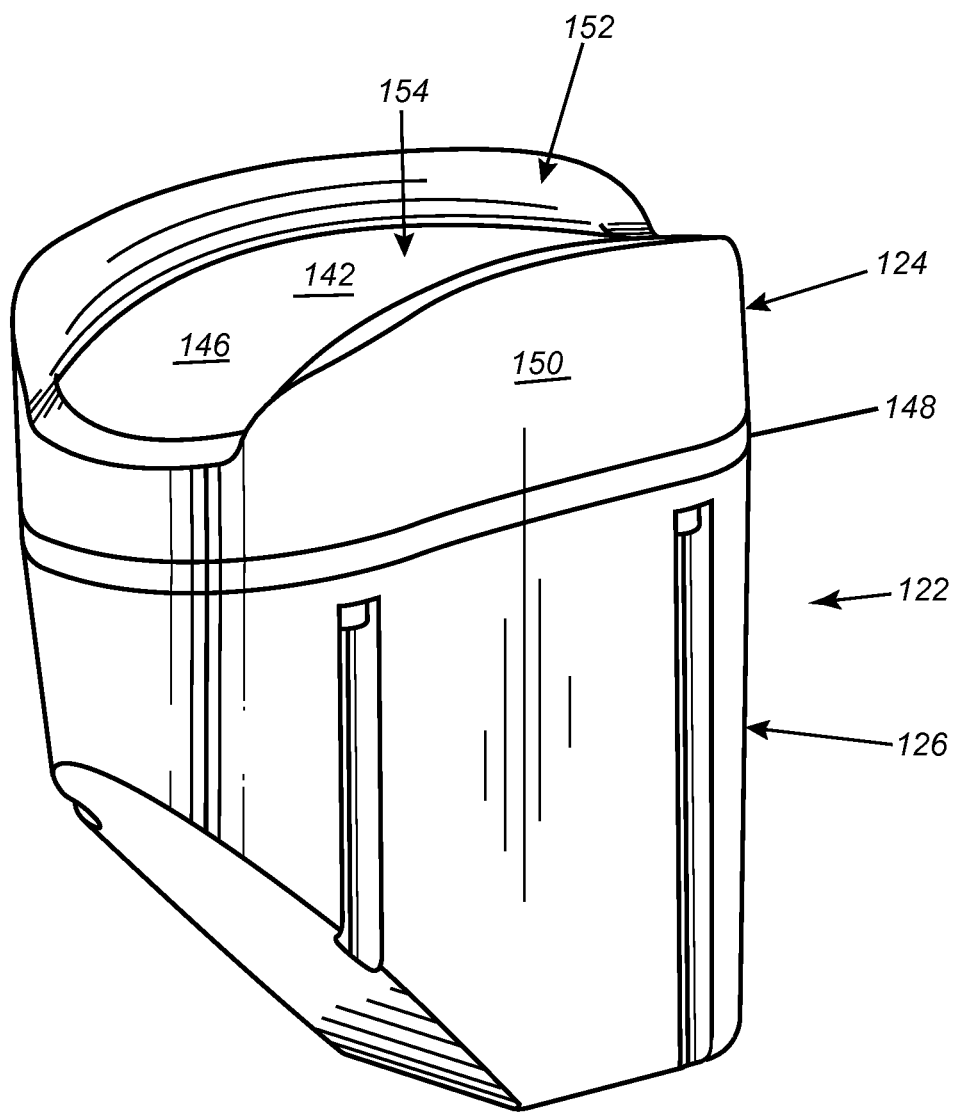
FIG. 6 is a rear top left side perspective view of a removable tension-pneumothorax-simulator cartridge.
Figure 7:
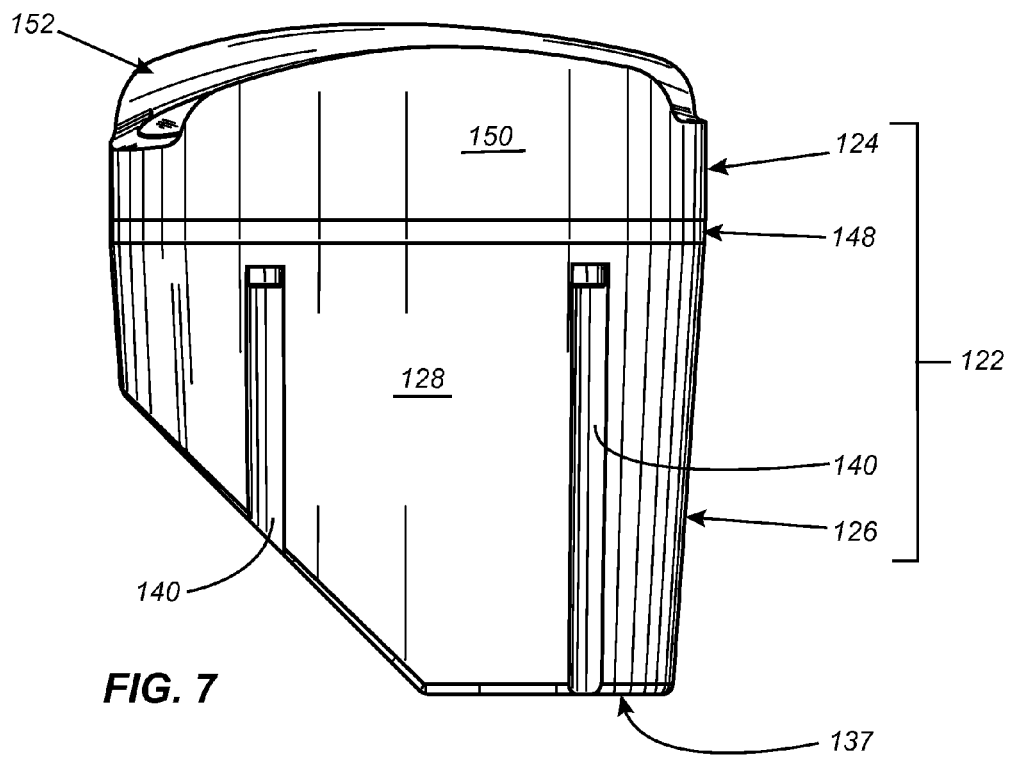
FIG. 7 is a rear elevation view of the removable tension-pneumothorax-simulator cartridge of FIG. 6.
Figure 8:
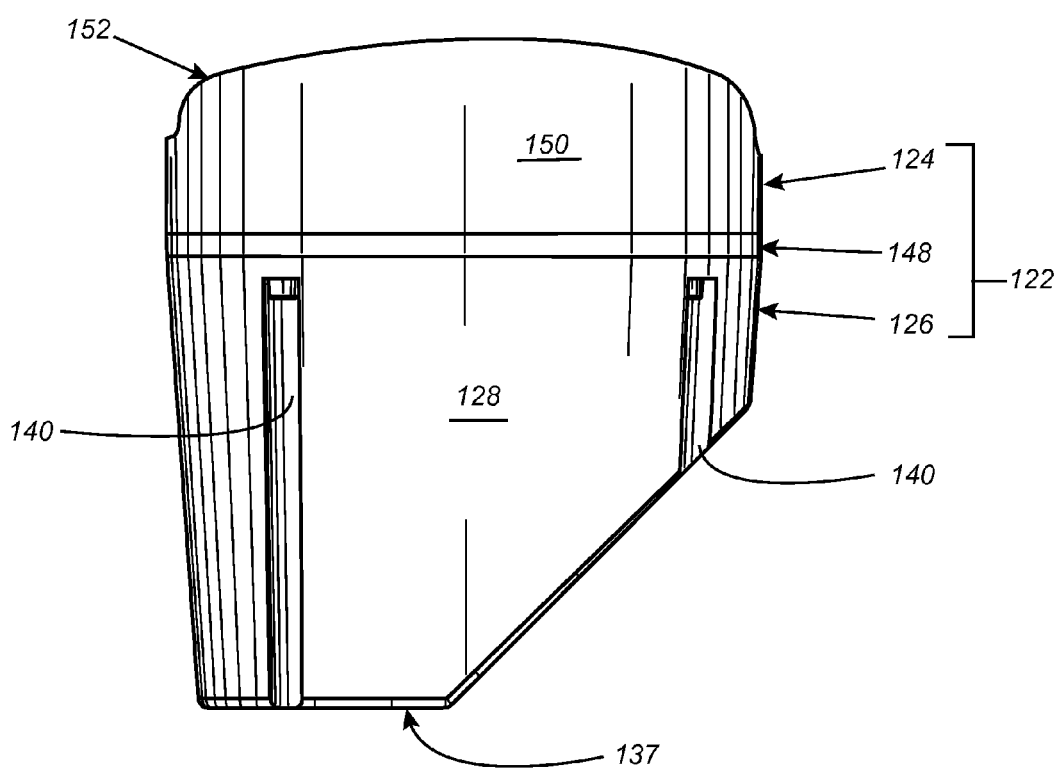
FIG. 8 is a front elevation view of the removable tension-pneumothorax-simulator cartridge of FIG. 6.
Figure 9:
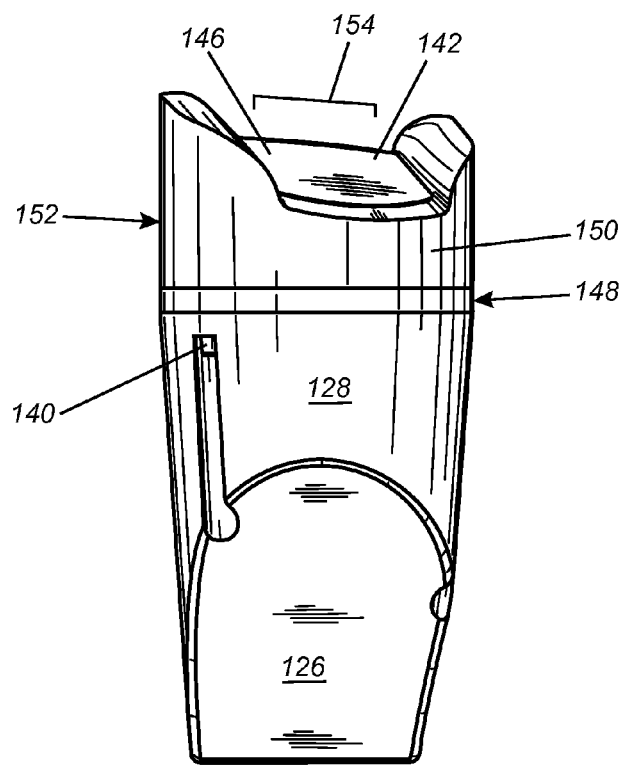
FIG. 9 is a right side elevation view of the removable tension-pneumothorax-simulator cartridge of FIG. 6.
Figure 10:
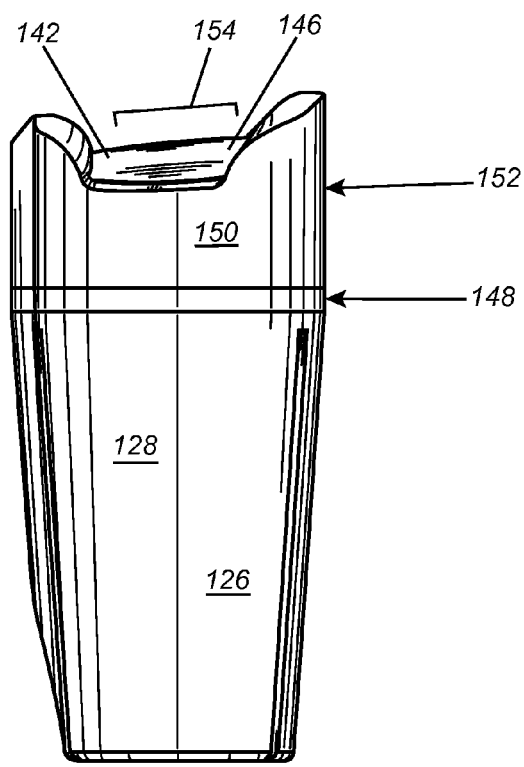
FIG. 10 is a left side elevation view of the removable tension-pneumothorax-simulator cartridge of FIG. 6.
Figure 11:
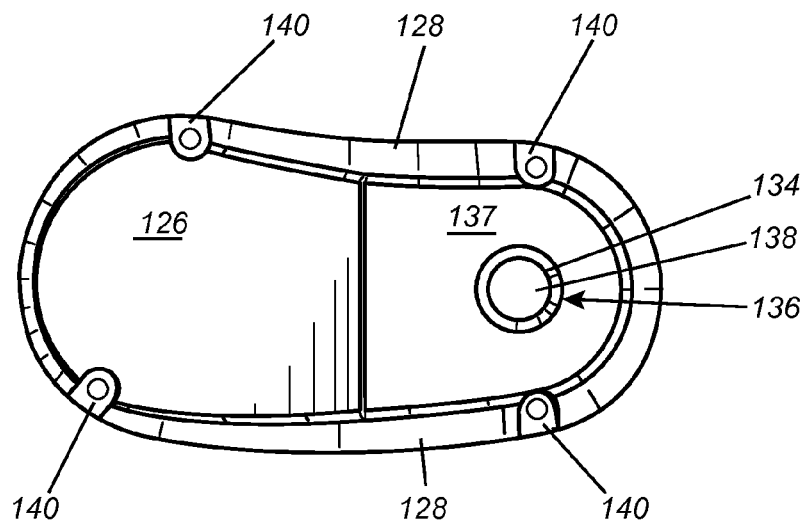
FIG. 11 is a bottom plan view of the removable tension-pneumothorax-simulator cartridge of FIG. 6.
Figure 12:
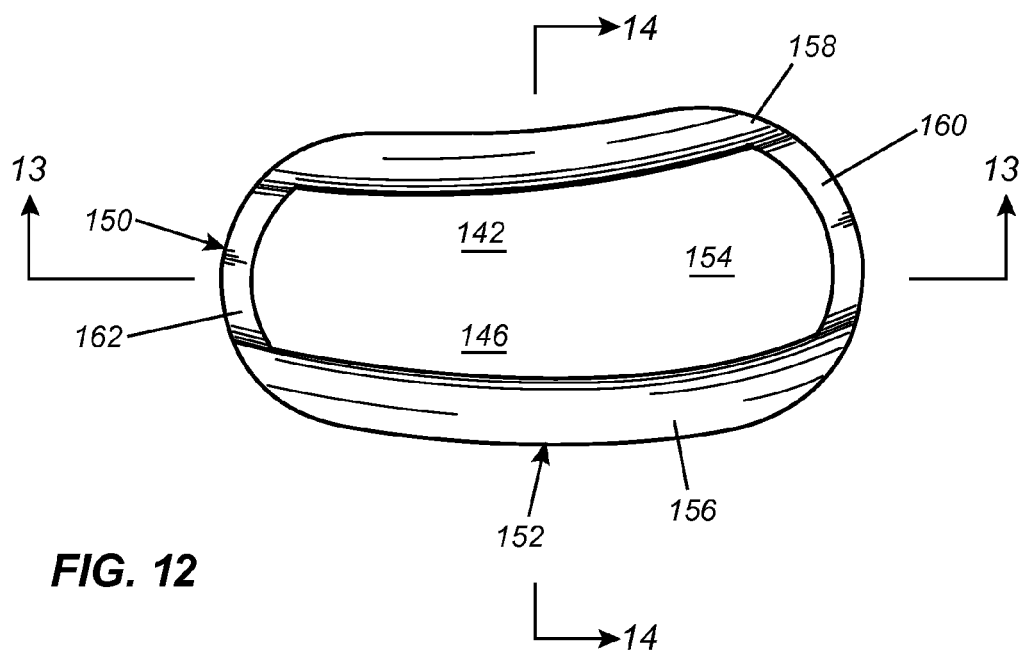
FIG. 12 is a top plan view of the removable tension-pneumothorax-simulator cartridge of FIG. 6.
Figure 13:
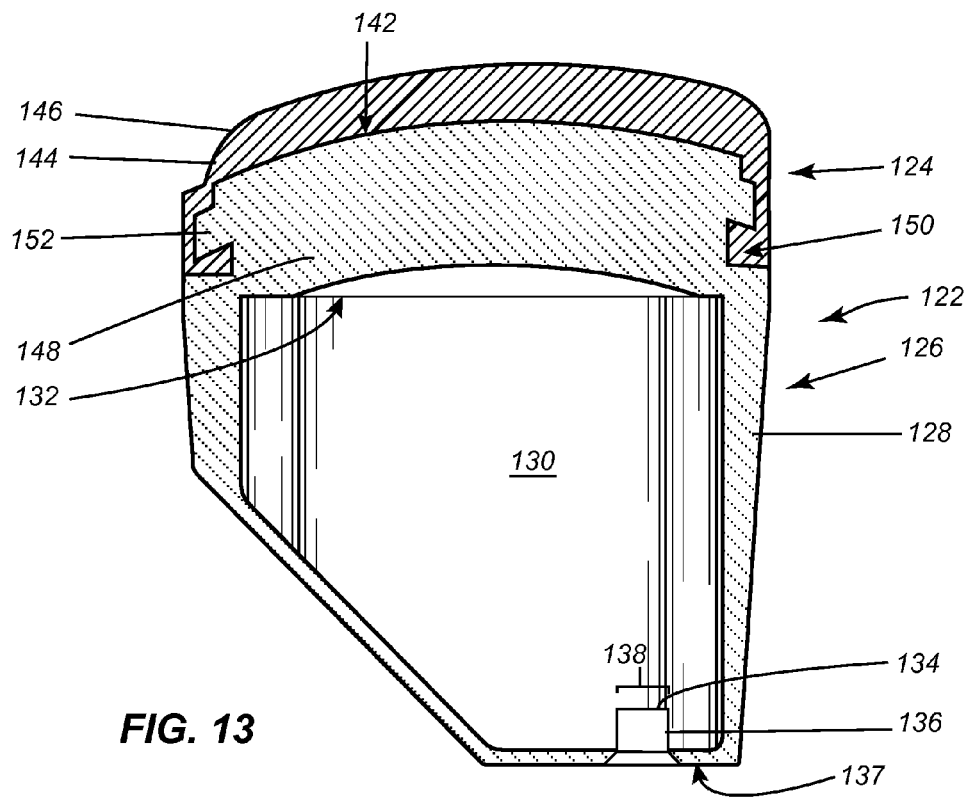
FIG. 13 is a longitudinal cross-section view of the removable tension-pneumothorax-simulator cartridge of FIG. 6 taking along the line 13-13 in FIG. 12.
Figure 14:
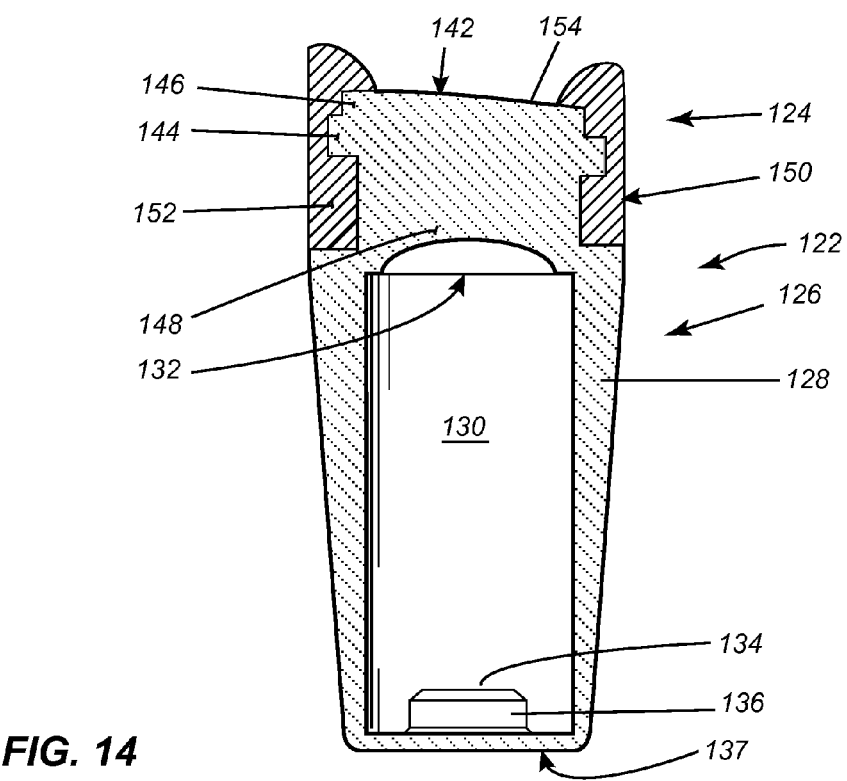
FIG. 14 is a transverse cross-section view of the removable tension-pneumothorax-simulator cartridge of FIG. 6 taking along the line 14-14 in FIG. 12.

The cap 150 has an external shape corresponding to that of body 128 of the bottom piece 126 and is shaped to be an extension thereof. The cap 150 can thus fit into the recess 100 of the rib cage 21 and mates with the side wall 110 thereof when the cartridge 122 is placed into the recess 100. The cap 150 has a side wall 152 with a central opening 154. The side wall 152 has a shape that is somewhat of an oval. Referring also to FIG. 5, the height of the side wall 152 varies such that when the cartridge 122 is placed in the recess 100, the side wall 152 mates with the rib case 21 so as to be generally flush with the rib cage 21 structures. Thus the side wall 152 has a section 156 that mates with and fills in the missing $2^{nd}$ rib 102 section 106 and has a section 158 that mates with and fills in the missing $3^{rd}$ rib 104 section 108 when the cartridge 122 is placed in the recess 100. The side wall 152 also has a sections 160, 162 that are flush with the inter-rib surface 164 of the rib cage 21 between the $2^{nd}$ rib 102 and the $3^{rd}$ rib 104. The central opening 154 allows for access to the three-part structure 142 to be pierced by the needle during training of the treatment for tension pneumothorax.

Figure 15:
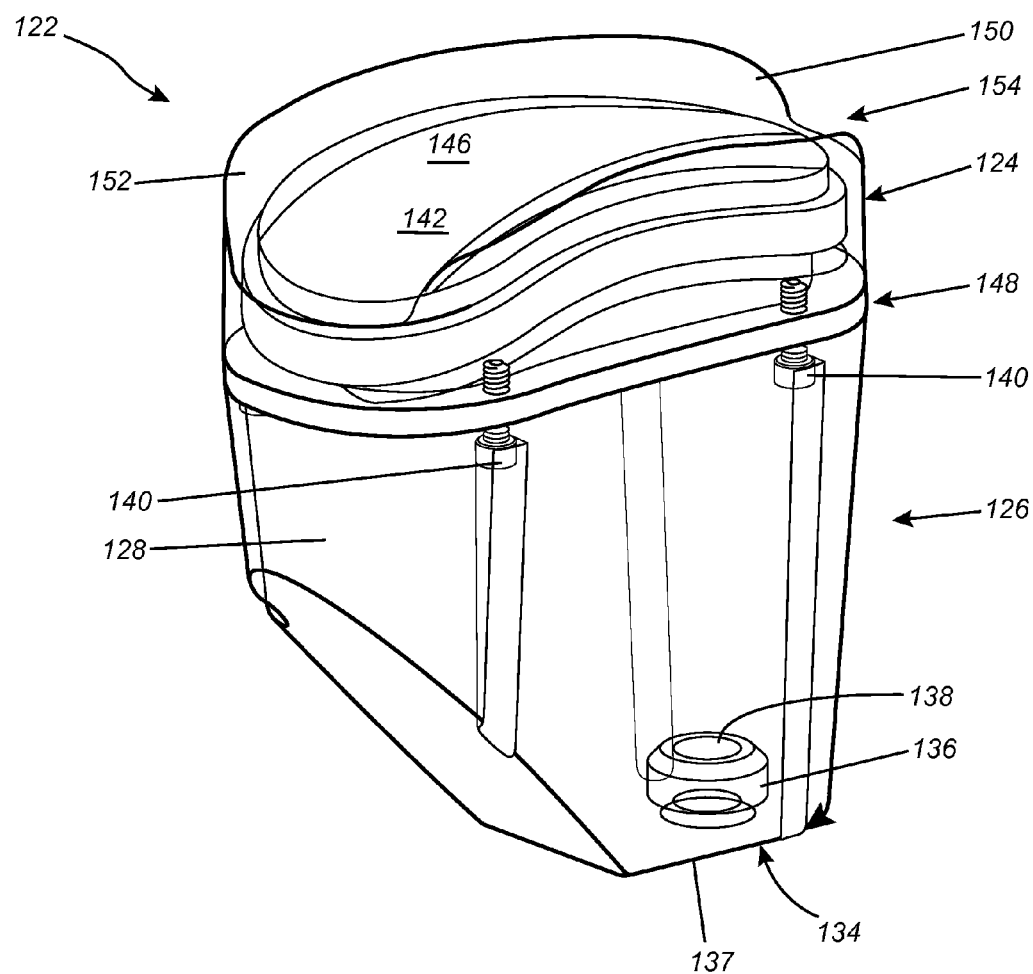
FIG. 15 is a rear top left side perspective view of a removable tension-pneumothorax-simulator cartridge with some of the structures thereof being shown as transparent to allow for the visualization of the interior structures thereof.
Figure 22:
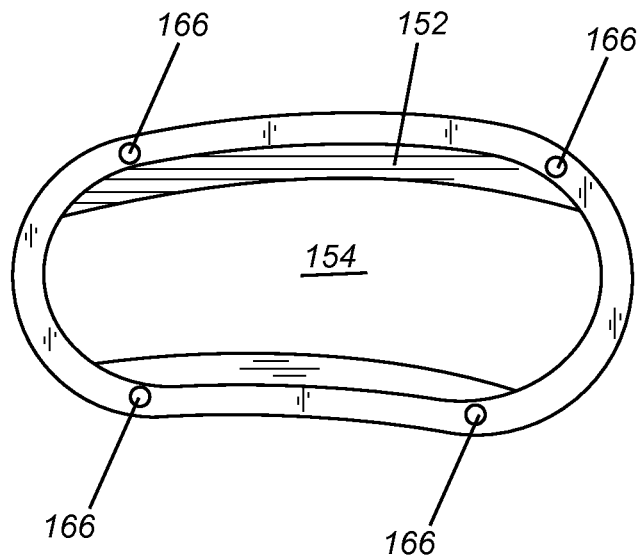
FIG. 22 is a bottom plan elevation view of the cap of FIG. 17.
Figure 23:
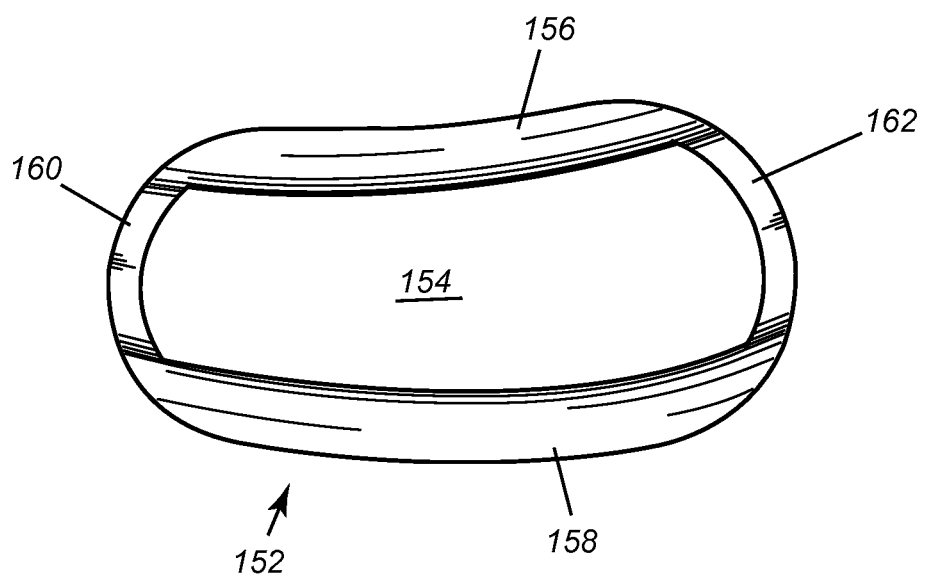
FIG. 23 is a bottom plan elevation view of the cap of FIG. 17.

To assemble the cartridge 122 the completed top piece 124 is placed onto the bottom piece 126 in proper aligned position. The cap 150 of the top piece 124 has four threaded holes 166 (FIG. 22). The inner layer 148 of the top piece also has 4 holes 168 (FIG. 16) that are aligned with the four holes 166. As best can be seen in FIG. 15, four screws 140 are then screwed upwards passing through the body 128 of the bottom piece 126, through the holes 168 in the inner layer 148, and are received in the four threaded holes 166 of the cap 150. The screws 140 are then tightened and the top piece 124 airtightly seals the first opening 132 of the cavity 130 of the body 128 of the bottom piece 126.

As best can be seen in FIG. 5, the cartridge 122 is then placed into the recess 100 in the rib cage of the mannequin 10. This causes the cylinder 116 to engage the cylinder 136 in a press-fit relationship. It is this press-fit relationship between the cylinders 116, 136 that retains the cartridge 122 within the recess 100. Once the cartridge 122 is properly and completely seated within the recess 100, the cavity 130 is airtight with the gas pressure therein being regulated and controlled by the mannequin's NCD system as is described below.

A right side removable tension-pneumothorax-simulator cartridge is a mirror image of the previously described left side removable tension-pneumothorax-simulator cartridge 122 and will not be described in further detail. As can been seen in FIG. 5, a right side cartridge is also inserted into the mannequin 10 in a similar manner to that described above with respect to the left side cartridge 122.

One the cartridges 122 are inserted into the rib cage 21 of the mannequin, they are covered with a foam to simulate the pectoral muscles and are then covered with skin 30 (as best can be seen in FIG. 1B).

Figure 24:
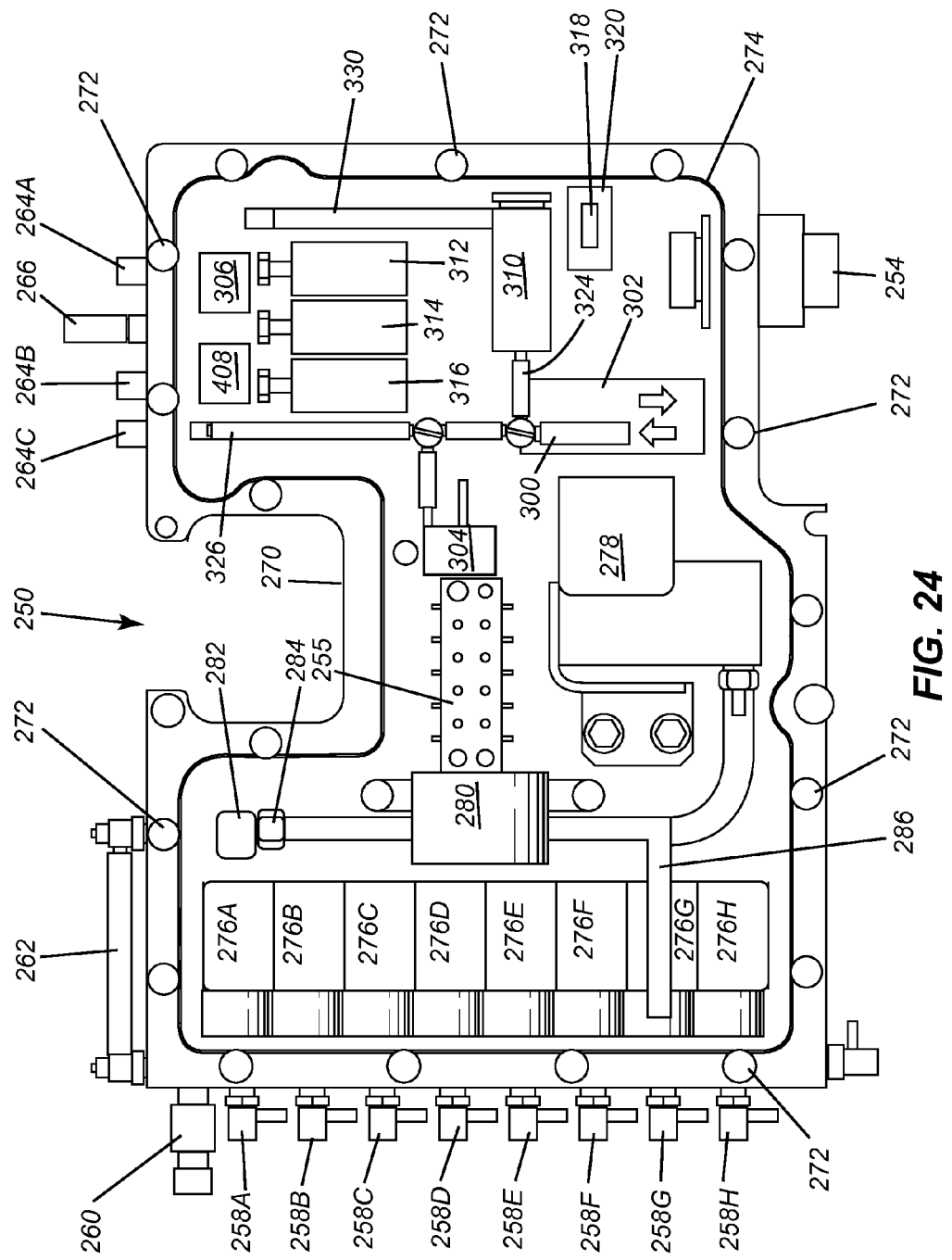
FIG. 24 is a front elevation view of the pump box of the mannequin with a front panel thereof removed.

The pneumatic components of the mannequin 10 are found in the pump box 250 (located in the interior of the mannequin 10) and their operation will now be described with reference to FIG. 24. The pneumatic components are part of the needle chest decompression (NCD) system used to simulate a realistic physiological response to the treatment of a tension pneumothorax. A tension pneumothorax is treated in the field by inserting a needle through the chest wall into the pleural cavity of the affected lung to allow air pressure built up in the pleural cavity to be released via the needle. The NCD system uses a left cartridge 122 and a right cartridge (not shown) located in the rib cage 21 (see FIG. 5). As was described above the cartridges 122 each have a three-piece silicone structure 142 simulating the chest wall that can be pierced by a needle. In use, the cartridges 122 are filled with pressurized air, as will be described below. When a needle is inserted through the structure 142 of one of the cartridges 122, the pressurized air therein is released through the needle, as would be the case in the real treatment of a tension pneumothorax. As will be explained below, the NCD system also simulates the sound of the air being release from the pleural cavity.

The pneumatic components include an air pump 302, pressure sensors 304, 306 and 308, a pressure regulator 310, and pneumatic valves 312, 314 and 316. Air is supplied from the atmosphere to the inside of the pump box 250 via a port 318 in the left side of the box body 270. A filter 320 is provided on the port 318 to prevent dust and debris from entering the pump box 250. The air pump 302 pumps the air inside the pump box 250. It is contemplated that the inlet of the air pump 302 could be connected directly to the port 318 via a line.

To ready the NCD system for the simulation of the treatment of a tension pneumothorax, the pump 302 is turned on and supplies air to a line 322. The line 322 branches into two lines 324 and 326. The line 326 is connected to the connector 264C. The connector 264C is connected via a line (not shown) to an air reservoir (not shown) formed in the spinal structural member 22 (see FIG. 4A). It is contemplated that the reservoir could be located anywhere else on the mannequin 10. As such, the pump 302 supplies air to the reservoir via the line 326. Air in the line 324 flows through the pressure regulator 310 and into line 330. From the line 330, the air flows into a passage (not shown) located behind the pressure sensors 306, 308 and formed in the box body 270. The passage communicates with the valves 312, 314 and 316. To ready both cartridges 300, the valves 312 and 316 are opened and the valve 314 is closed. It is contemplated that only one of the valves 312 and 316 could be opened should only one of the cartridges 300 need to be readied. From the valves 312 and 316, the air flows to the connectors 264A and 264B respectively. The connectors 264A and 264B are connected via lines (not shown) to the left and right cartridges 122 respectively. When the pressure sensor 306 senses that the air pressure inside the left cartridge 300 has reached 6.9 kPa (1 psi) above the atmospheric pressure, the valve 312 is closed and air is no longer supplied to the left cartridge 300 by the pump 302. Similarly, when the pressure sensor 308 senses that the air pressure inside the right cartridge 300 has reached 6.9 kPa (1 psi) above atmospheric pressure, the valve 316 is closed and air is no longer supplied to the right cartridge 300 by the pump 302. When both valves 312 and 316 are closed, the pump 302 continues to supply air to the reservoir 328 until the pressure sensor 304 senses that the air pressure inside the reservoir 328 has reached 137.9 kPa (20 psi) above atmospheric pressure, at which point the pump 302 is turned off. The NCD system is now ready to be used. It is contemplated that air pressures different from the ones indicated above could be used.

When a needle is inserted through the three-part silicone structure 142 of the left cartridge 122, air flows out of the left cartridge 122 via the needle and the pressure sensor 306 senses a drop in air pressure inside the left cartridge 122. In response to the pressure drop, the valve 314 is opened causing the high pressure air in the reservoir to flow sequentially through the line 326, the line 324, the pressure regulator 310, the line 330, the passage formed in the box body 270, the valve 314, and finally the air outlet 266 where the high pressure air is released to the atmosphere. By being released to the atmosphere, the high pressure air generates an air release sound which indicates to the trainee and the instructor that the treatment is successful. When a needle is inserted through the silicone insert of the right cartridge, the pressure sensor 308 senses a drop in air pressure inside the right cartridge and the valve 314 is opened also causing the air from the reservoir 328 to be released to the atmosphere via the air outlet 266.

After the simulation, once the needle has been removed, the first central material 144 of the three-part structure 142 self-seals. The system can then be reset and the cartridge 122 repressurized and readied for use again. Alternatively (if for example the mannequin 10 is to be stored) any pressurized air remaining in the cartridges 122 and the reservoir 328 can be released to the atmosphere via the outlet 266 by opening all three valves 312, 314 and 316.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A removable tension-pneumothorax-simulator cartridge for use with a patient-simulating mannequin, comprising:

a rigid body having a hollow cavity therein, the rigid body having two openings in fluid communication with the hollow cavity, the hollow cavity being shaped and dimensioned so as to be capable of receiving therein through the first opening a needle for treating a simulated tension pneumothorax in the patient-simulating mannequin;

the first opening having an associated first-opening closure, the first-opening closure being releasably secured to the rigid body and airtightly sealing the first opening, the first-opening closure including a first material pierceable by the needle for simulating treatment of the simulated tension pneumothorax in the patient-simulating mannequin, the first material being self sealing such that when the needle, having pierced the first material, is withdrawn from the first material, the first material self seals;

the rigid body being constructed of a second material not pierceable by the needle;

the first opening being located on the rigid body such that when the cartridge is inserted into the patient-simulating mannequin, the first material is accessible for simulating treatment of the simulated tension pneumothorax by insertion of the needle into the patient-simulating mannequin;

the second opening being structured and dimensioned to releasably engage cooperable structure on the patient-simulating mannequin such that when the cartridge is inserted into the patient-simulating mannequin, the cooperable structure on the patient-simulating mannequin engages and airtightly seals the second opening and provides a channel in fluid communication with the hollow cavity of the rigid body for allowing for the entry of a pressurized gas into the cavity for use in simulating the simulated tension pneumothorax.

2. The tension-pneumothorax-simulator cartridge of claim 1, wherein the wall is shaped to complete at least one of $2^{nd}$ and $3^{rd}$ simulated human ribs of the patient-simulating mannequin when the cartridge is inserted into the patient-simulating mannequin.

3. The tension-pneumothorax-simulator cartridge of claim 1, wherein the first material is a material selected from a group consisting of: silicone rubbers.

4. The tension-pneumothorax-simulator cartridge of claim 1, wherein the first-opening closure has a rigid wall surrounding the first material.

5. The tension-pneumothorax-simulator cartridge of claim 4, wherein the first-opening closure has a rigid flange attached to the wall, the first-opening closure being releasably secured to the rigid body via fasteners fastening the flange to the rigid body.

6. The tension-pneumothorax-simulator cartridge of claim 1, further comprising an outer covering layer covering the first material.

7. The tension-pneumothorax-simulator cartridge of claim 6, wherein the outer covering layer includes a material selected from the group consisting of: silicone rubbers.

8. The tension-pneumothorax-simulator cartridge of claim 1, wherein the rigid body has a side wall and a bottom wall, the first opening being at the top of the rigid body, the second opening being in the bottom wall of the rigid body.

9. The tension-pneumothorax-simulator cartridge of claim 8, wherein the side wall of the rigid body is a front side wall, a rear side wall, a left side wall, and a right side wall.

10. The tension-pneumothorax-simulator cartridge of claim 1, further comprising an inner covering layer covering the first material.

11. The tension-pneumothorax-simulator cartridge of claim 10, wherein the inner covering layer includes a material selected from the group consisting of: silicone rubbers.

12. The tension-pneumothorax-simulator cartridge of claim 10, wherein the inner covering layer has a Shore hardness of approximately that of the human pleural cavity.

13. The tension-pneumothorax-simulator cartridge of claim 1, wherein the second opening releasably engages the cooperable structure on the patient-simulating mannequin via a press fit.

14. The tension-pneumothorax-simulator cartridge of claim 13, wherein the cartridge is releasably secured to the patient-simulating mannequin solely via the press fit between the second opening and the cooperable structure.

15. The tension-pneumothorax simulator cartridge of claim 13, wherein the second opening includes a second-opening cylinder extending into the cavity, wherein the cooperable structure of the patient-simulating mannequin includes a cooperative-structure cylinder, and wherein the press fit is between the second-opening cylinder and the cooperative-structure cylinder when the cartridge is inserted into the patient-simulating mannequin.

16. The tension-pneumothorax-simulator cartridge of claim 15, wherein the channel is formed by a passage through the cooperative-structure cylinder.

17. A system for simulating treatment of a simulated tension pneumothorax, the system comprising:
a patient-simulating mannequin; and
a removable tension-pneumothorax-simulator cartridge for use with the patient-simulating mannequin, the cartridge comprising;
a rigid body having a hollow cavity therein, the rigid body having two openings in fluid communication with the hollow cavity, the hollow cavity being shaped and dimensioned so as to be capable of receiving therein through the first opening a needle for treating the simulated tension pneumothorax;
the first opening having an associated first-opening closure, the first-opening closure being releasably secured to the rigid body and airtightly sealing the first opening, the first-opening closure including a first material pierceable by the needle for simulating treatment of the simulated tension pneumothorax in the patient-simulating mannequin, the first material being self sealing such that when the needle, having pierced the first material, is withdrawn from the first material, the first material self seals;
the rigid body being constructed of a second material not pierceable by the needle;
the first opening being located on the rigid body such that when the cartridge is inserted into the patient-simulating mannequin, the first material is accessible for simulating treatment of the simulated tension pneumothorax by insertion of the needle into the patient-simulating mannequin;
the second opening being structured and dimensioned to releasably engage cooperable structure on the patient-simulating mannequin such that when the cartridge is inserted into the patient-simulating mannequin, the cooperable structure on the patient-simulating mannequin engages and airtightly seals the second opening and provides a channel in fluid communication with the hollow cavity of the rigid body for allowing for the entry of a first pressurized gas into the hollow cavity for use in simulating the simulated tension pneumothorax;
the patient-simulating mannequin comprising a computer processor configured to:
admit the first pressurized gas into the hollow cavity to raise the pressure of the first pressurized gas in the hollow cavity to a first pressure above atmospheric pressure;
detect a pressure drop in the pressure of the first pressurized gas in the hollow cavity caused by the needle piercing the first material and being inserted into the hollow cavity; and
release a second pressurized gas to provide an auditory signal simulating a release of air from a pleural cavity of human being treated for a tension pneumothorax when the pressure drop is detected.

18. The system for simulating treatment of a simulated tension pneumothorax of claim 17, wherein the first pressure above atmospheric pressure is between 0 psi (0 kPa) and 2 psi (13.8 kPa) above atmospheric pressure.

19. The system for simulating treatment of a simulated tension pneumothorax of claim 17, wherein a pump is configured to admit the first pressurized gas into the hollow cavity to raise the pressure of the gas in the hollow cavity to the first pressure above atmospheric pressure.

20. The system for simulating treatment of a simulated tension pneumothorax of claim 17, wherein a pressurized gas reservoir in the interior of the patient-simulating mannequin is configured to release the second pressurized gas to provide the auditory signal simulating a release of air from a pleural cavity of a human being treated for a tension pneumothorax.

* * * * *